United States Patent

Baggett et al.

[11] Patent Number: 5,549,489
[45] Date of Patent: Aug. 27, 1996

[54] CONNECTOR MODULE WITH TEST AND JUMPER ACCESS

[75] Inventors: William C. Baggett, Duluth, Ga.; Elliot A. Baines, Jr., Morris; Wayne S. Filus, Lebanon, both of N.J.; Dianne W. Gilland, Lawrenceville, Ga.; Theodore E. Kluska, Glen Rock, N.J.; Wayne D. Larsen, Indianapolis, Ind.; Mark G. Spaulding, Florham Park; Jeremia P. Starace, Nutley, both of N.J.

[73] Assignee: Lucent Technologies Inc., Murray Hill, N.J.

[21] Appl. No.: 442,863

[22] Filed: May 17, 1995

[51] Int. Cl.⁶ .................................................. H01R 9/22
[52] U.S. Cl. .......................... 439/709; 439/43; 439/719; 439/922
[58] Field of Search .................... 439/43, 188, 395, 439/404, 709, 719, 922; 361/119, 124; 174/138 F

[56] References Cited

U.S. PATENT DOCUMENTS

| | | |
|---|---|---|
| 3,308,422 | 3/1967 | Boysen ........................... 439/43 |
| 3,798,587 | 3/1974 | Ellis, Jr. et al. . |
| 3,966,074 | 6/1976 | Hotchkiss et al. ............... 174/138 F |
| 4,059,331 | 11/1977 | Sedlacek et al. ................. 439/719 |
| 4,146,755 | 3/1979 | Causse ........................... 361/119 |
| 4,171,857 | 10/1979 | Forberg et al. . |
| 4,283,103 | 8/1981 | Forberg et al. . |
| 4,846,735 | 7/1989 | Teichler et al. ................. 361/119 |
| 4,851,967 | 7/1989 | Gerke et al. ..................... 439/709 |
| 5,157,580 | 10/1992 | Hegner et al. ................... 361/124 |
| 5,163,855 | 11/1992 | Gerke et al. ..................... 439/709 |
| 5,364,288 | 11/1994 | Drewanz et al. ................. 439/709 |

OTHER PUBLICATIONS

U.S. Patent Application of Baggett et al., Serial No. 08/442,901, filed May 17, 1995 (W. C. Baggett 3-3-10).
U.S. Patent Application of Baggett et al., Serial No. 08/442,886, filed May 17, 1995 (W. C. Baggett 1-1-1-1-1-1-8).

*Primary Examiner*—Gary E. Elkins
*Attorney, Agent, or Firm*—Lester H. Birnbaum

[57] ABSTRACT

Disclosed is a connector module which permits a make-before-break contact when inserting jumper or test access leads. The stem portions of the contacts make physical and electrical contact at two points which are aligned with slots in the module so that one point remains closed while one point opens due to lead insertion. Ribs may also be provided to guide the lead insertion and control deflection of the leads and stems.

6 Claims, 4 Drawing Sheets

CONNECTOR MODULE WITH TEST AND JUMPER ACCESS

BACKGROUND OF THE INVENTION

This invention relates to modules for electrically connecting sets of wires.

In the telecommunications industry, connecting blocks comprising an array of insulation displacement contacts are typically used in telephone central offices, building entrance terminals, and outside plant cabinets for electrical connection between cables and cross-connect wiring. One example of such a connecting block is the standard 110-type connector block. (See, for example, U.S. Pat. No. 3,798,587 issued to Ellis, Jr. et al.) Such connector blocks include rows of insulation displacement contacts mounted within a plastic module. Each contact includes insulation piercing slots on both ends. One set of wires is placed within a (index) strip, and the contact module is placed over the wires in order to make contact therewith. A second set of wires is inserted into the opposite end of the contacts to complete the electrical connection between the sets of wires. In some recent systems, connector modules include slots for mounting protectors which are electrically connected to the contacts. (See, for example, U.S. Pat. Nos. 4,171,857 and 4,283,103 issued to Forberg et al.)

While the prior art blocks are adequate, wiring was generally done on a single surface, and when protector components were also mounted on the block, it was necessary to remove the protectors before inserting jumper wires or test probes. In accordance with U.S. Patent Application of Baggett et al. Case 1-1-1-1-1-1-8 filed on an even date herewith, a module is described which permits wiring on two surfaces and insertion of patch cords or test leads into one surface while a protector component is mounted on the opposite surface. In such modules, it is desirable to ensure that the protector remains connected to at least some contacts when a test probe is inserted in the block so that protection is not interrupted. Further, it is desirable to have a "make-before-break" capacity so that signaling is not interrupted when a patch cord or test access lead is inserted.

SUMMARY OF THE INVENTION

The invention is a connector module which includes two rows of contacts mounted within an insulating housing having a top and bottom surface. Each contact includes an end portion which is capable of providing electrical connection to a corresponding wire, and a stem portion. The contacts are mounted so that the end portions of the first row extend through the top surface and the end portions of the second row extend through the bottom surface. The stem portions of corresponding contacts of the first and second rows extend into the housing and make electrical contact on at least two points of the stem portions. The points of contact are aligned with slots in the top and bottom surfaces.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
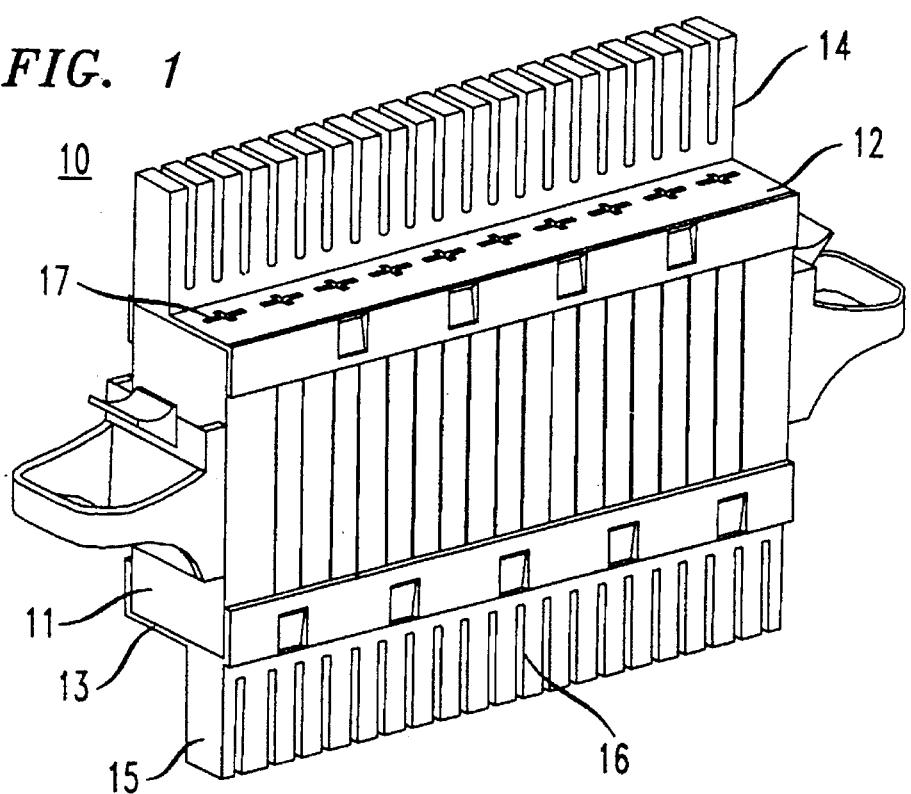
FIG. 1 is a perspective view of a module in accordance with an embodiment of the invention.
Figure 4:
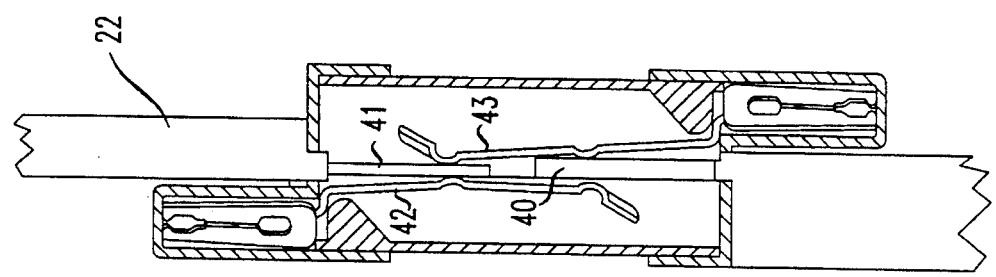
FIGS. 4–7 are cross-sectional views of a module in accordance with the same embodiment.

Illustrated in FIG. 1 is a module, 10, which can be inserted into a frame (not shown) along with other similar modules to form a connecting block. (For details concerning the mounting frame see U.S. Patent Application of Baggett et al. Case 3-3-10 filed on an even date herewith.) The module includes a housing which is made of insulating material such as plastic. The housing, includes an essentially rectangular body portion, 11, which is covered by caps, 14 and 15. The caps can be made of the same material as the housing and define an upper and lower surface, 12 and 13, respectively, for the housing. Each cap includes a series of slits, e.g., 16, which permit insertion of a wire (e.g., 61 of FIG. 4) therein as discussed below. Each cap also includes a series of slots, e.g., 17 and 18 of FIGS. 1 and 4, in the top and bottom surfaces, 12 and 13, of the housing, which slots permit insertion of leads, e.g., 40 and 41, which may be electrically coupled to a single protector, 21 of FIG. 5, a test probe, 22 of FIG. 7, a patch cord, 50 of FIG. 9, a cartridge protector (not shown), or possibly other components.

Figure 2:
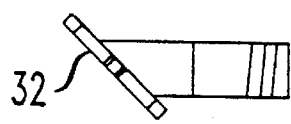
FIGS. 2 and 3 are top and side views, respectively, of a contact in accordance with the same embodiment.
Figure 3:
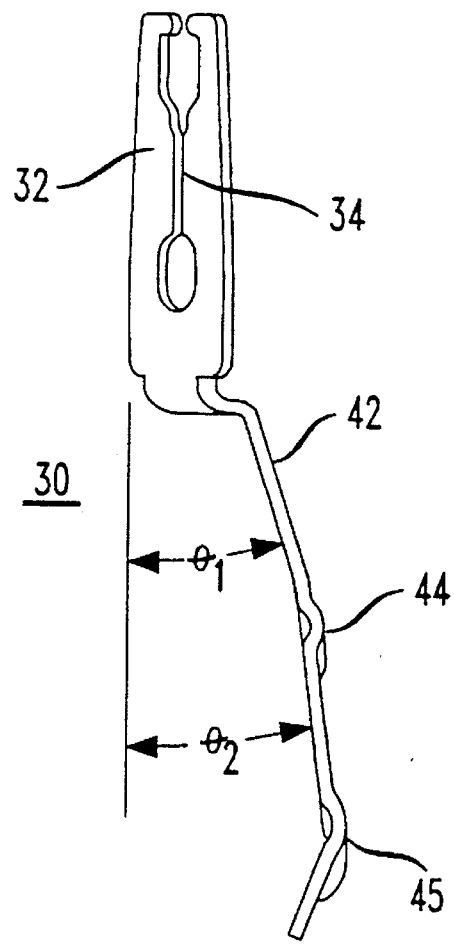

As illustrated in FIGS. 4–7, mounted within the housing is a first row of contacts, e.g., 30, and a second row of contacts, e.g., 31, one of which contacts (30) is illustrated in more detail in FIGS. 2 and 3. Each contact, 30 and 31, includes an end portion, 32 and 33, respectively, which is capable of providing electrical connection to a wire, 60 and 61, respectively. In this embodiment, the end portions each comprise a slot, 34 and 35, which pierces the insulation surrounding the wire to establish electrical contact as the wire is inserted to proper depth. The contacts are mounted so that the end portions of the first row of contacts, e.g., 30, protrude through the top surface, 12, of the housing, while the end portions of the second row of contacts, e.g., 31, protrude through the bottom surface, 13, of the housing. The end portions, e.g., 33, are also aligned with corresponding slits, e.g., 16 of FIG. 1, in the caps, e.g., 15 of FIG. 1, so that wires, e.g., 61, may be inserted through the caps for electrical connection by the contacts.

The remainder of the contacts, 30 and 31, also known as the stem portions, 42 and 43, respectively, extend in the body portion, 11. As illustrated in FIG. 2, the faces of the end portions, e.g., 32, are advantageously at an angle of approximately 45 degrees with the longitudinal axis of the stem portions, e.g., 42. As illustrated in FIG. 3, the stem portion, e.g., 42, of each contact, e.g., 30, extends from the end portion at a first angle, $\theta_1$, from an edge of the end portion in the plane of the longitudinal axis, and further down the stem, extends at a second angle, $\theta_2$, from the edge of the end portion. In this particular example, $\theta_1$ was 17 degrees and $\theta_2$ was 2 degrees. Typically, $\theta_1$ is in the range of 10 to 20 degrees, while $\theta_2$ is in the range −10 to +20 degrees. Use of a double angle is advantageous in narrowing the width. (w) of the housing portion, 11, by permitting the end portions to be placed closer together. However, leads with a single angle may be employed. It will be appreciated that the contacts in the first and second rows may be identical, but oriented in opposite directions.

The stem portions, e.g., 42, each include a pair of raised portions, 44 and 45, which are plated with a precious metal or alloy to provide electrical contact. As illustrated in FIGS. 4–7, these raised portions establish two points of electrical contact, 38 and 39, between corresponding contacts, 30 and 31, of the first and second rows. Each top point of contact, e.g., 38, is aligned with a slot, e.g., 17, in the top surface, 12, while each bottom point of contact, 39, is aligned with a slot, e.g., 18, in the bottom surface of the housing.

Figure 5:
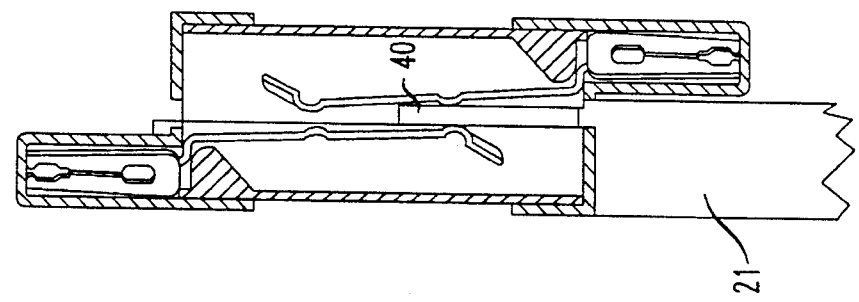

As illustrated in FIG. 5, when the lead, 40, coupled to a protector, 21, (or to a patch cord such as shown as 50 in FIG. 9), is inserted into a desired slot, e.g., 18, it will initially push apart the two stem portions, 42 and 43, at the contact point, 39, aligned with the slot. However, the stems at the other contact point, 38, will initially remain touching to ensure a "make-before-break" connection so as not to interrupt signaling between the two contacts, 30 and 31. (In actual practice, a make-before-break feature is generally not needed to plug in a protector, but the principle is demonstrated with the use of protector 21.)

Such a make-before-break capability is possible due to a number of features. Primarily, the point 38 remains closed even when the point 39 is opened due to the fact that when a lead is inserted into point 39 from the bottom as shown, the deflection of stem 42 is greater than the deflection of stem 43. This is because the bending moment of stem 43 is dependent upon the distance (a) from the bottom surface of the housing to the point of contact 39, while the bending moment of stem 42 is dependent upon the distance (b) from the top surface of the housing to the point of contact 39. Clearly, the distance (b) is greater than the distance (a), and, consequently, the displacement of stem 42 is greater than the displacement of stem 43 thereby urging the surface (44 of FIG. 3) of stem 42 into contact with the corresponding surface of stem 43 at contact point 38 while contact point 39 is opening. It will be appreciated that the same principles operate in reverse if a lead were to be inserted from the top, i.e., stem 43 would be deflected more than stem 42 since the bending moment of stem 43 would be measured from contact 38 to the bottom surface, while the bending moment of stem 42 would be measured from the top surface to contact point 38.

Figure 6:
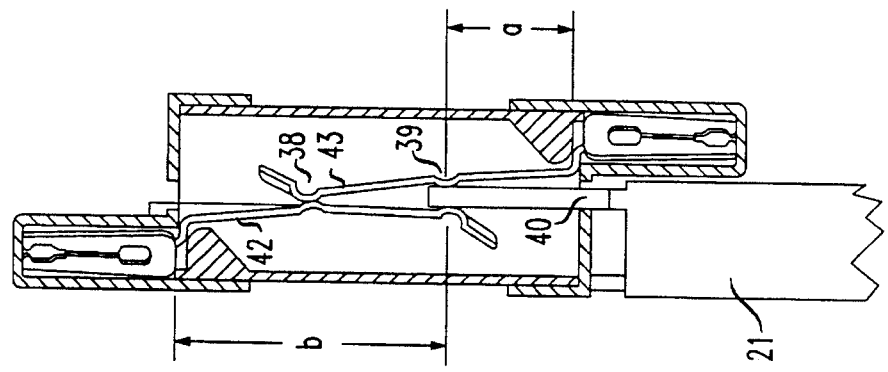
Figure 9:
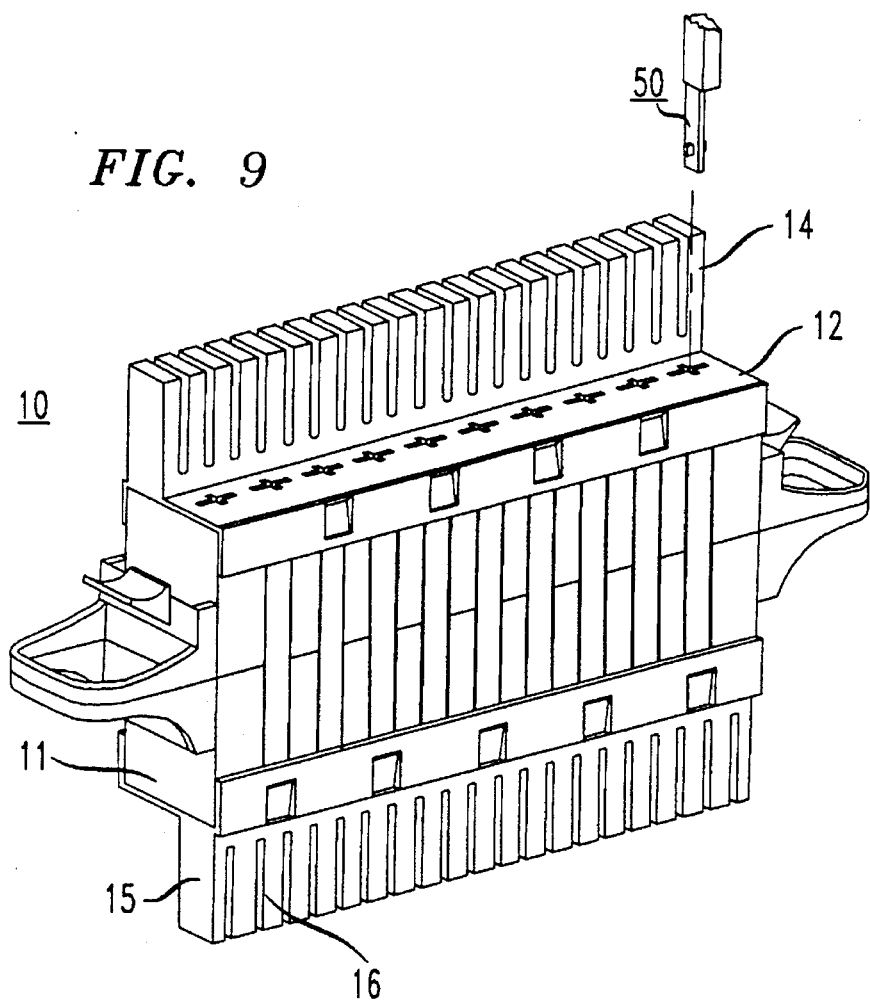
FIG. 9 is a further perspective view of the module in accordance with the same embodiment.

As illustrated in FIG. 6, the other point of contact, 38, will eventually separate as the lead is further inserted through the two stem portions, and the protector, 21, is seated on the bottom surface, 13, of the housing. Consequently, with the protector, 21, in its final position, current between the contacts, 30 and 31, will flow only through the protector. The same sequence depicted in FIGS. 5 and 6 will occur when a patch cord such as shown in FIG. 9 is inserted into one of the slots, e.g., 17 or 18.

Figure 7:
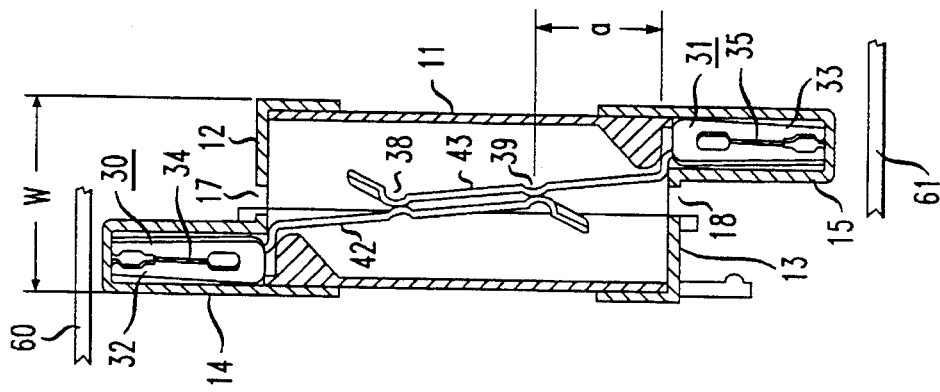

If at some point it is desired to provide test access to the contacts, 30 and 31, as illustrated in FIG. 7, a lead, 41, attached to a test cord, 22, can be inserted into the slot, 17, on the surface of the housing opposite to the protector, 21. The test lead, 41, will push apart further the point of contact, 38, not occupied by the protector lead. However, due to the bending moments previously described, the stem 43 will remain in contact with the protector lead to continue to provide protection to the cable and circuitry (not shown) coupled to the bottom end portions, e.g., 33. However, the stem 42 coupled to end portion 32 will separate from the protector lead 40 in order to permit testing in both directions independently while providing voltage surge protection to the circuit.

Figure 10:
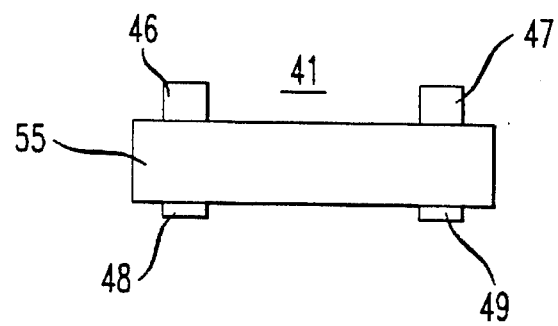
FIG. 10 is an end view of a lead which may be used with the module in accordance with the same embodiment.

The displacement of stem 42 away from lead 40 is advantageously produced by a type of lead, 41, for the test probe which is illustrated in FIG. 10.

The lead basically comprises an insulating substrate, 55, such as epoxy glass with a thickness, typically, of approximately 1–2 mm. The substrate, 55, includes a pair of conductors, 46 and 47, on one surface, and a pair of conductors, 48 and 49, on the opposite surface. It will be noted that the thickness of the conductors, 46 and 47, on one surface is significantly greater than the thickness of the conductors, 48 and 49, on the opposite surface. Typically, the thickness of conductors 46 and 47 is 0.50 mm, while the thickness of the conductors 48 and 49 is 0.25 mm. In general the thickness of one pair should be at least two times greater than the thickness of the other pair.

It will be appreciated that by inserting the lead 41 so that the thicker contact, e.g., 47, makes contact with stem 42 while the thinner contact, e.g., 49, makes contact with stem 43 (and the other contacts, 46 and 48, make similar contact with an adjacent pair of contacts (not shown) in the row), stem 42 will be displaced an additional amount to separate it from the protector lead, 40.

Figure 8:
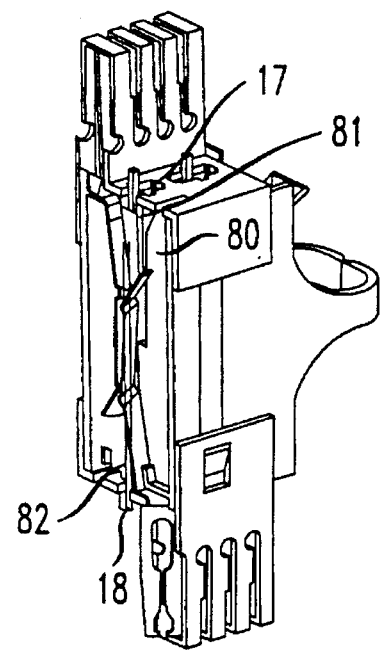
FIG. 8 is a perspective, partly cut-away view of a portion of the module in accordance with the same embodiment.

As illustrated in FIG. 8, a series of ribs, e.g., 80, is provided between the stem portions, e.g., 42 and 43, of each contact pair, 30 and 31, and extending across the width of the body portion, 11. Each rib, 80, includes a channel, 81, aligned with a slot, 17, in the top surface of the housing, and a channel, 82, (partly obscured in this view), aligned with a slot, 18, in the bottom surface of the housing. Each channel, 81 or 82, captures a portion of the lead, 41 or 40 of FIGS. 6–7, inserted into a corresponding slot, 17 or 18.

It will be appreciated that the channels, 81 and 82, prevent bending of the leads, 41 and 40, as they are inserted, and, therefore, prevent excessive deflection of the stem portions, 42 and 43, which could result in the stems being bent beyond their elastic limit. Also, since the slots, 17 and 18, and corresponding channels, 81 and 82, are offset to align with a corresponding contact point, 38 and 39 of FIG. 4, the rib, 80, can also serve to aid the desired deflections of the stem portions previously described.

Various modifications of the embodiment described herein will become apparent to those skilled in the art. For example, the body portion, 11, need not be open on the top and bottom and covered by a cap as shown, but can have its own top and bottom surface with either no cap or with a cap which covers only the end portions of the contacts.

Thus, it will be appreciated that the connector module described herein has several advantages. For example, it permits cable wires, e.g., 61, to be connected to one row of contacts, e.g., 31, and cross-connect wires, e.g., 60, to be connected to the other row of contacts, e.g., 30, on the opposite surface of the module. At the same time, the double contact points for electrically connecting contacts of the two rows permit a lead to be inserted into one point before the other point is separated thus establishing a make-before-break contact. The double contact points also permit test access from one surface of the module while a protector is mounted on the other surface to provide continuing protection.

The invention claimed is:

1. A connector module comprising:

an insulating housing having a top and bottom surface;

first and second rows of contacts mounted within the housing, each contact including an end portion which is capable of providing electrical connection to a corresponding wire and a stem portion, the contacts being mounted so that the end portions of the first row extend through the top surface and the end portions of the second row extend through the bottom surface, the end portions of the first and second rows being laterally displaced, and the top and bottom surfaces including slots adjacent to the corresponding rows for receiving therein leads which make electrical contact with corresponding contacts, the stem portions of corresponding contacts of the first and second rows making electrical contact on at least two contact points, one contact point being aligned with a slot in the top surface and the other contact point being aligned with a slot in the bottom surface.

2. A connector module according to claim 1 wherein each end portion provides electrical connection by means of an insulation piercing slot.

3. A connector module according to claim 1 wherein the contact points include raised surfaces of the stem portions of the corresponding contacts.

4. A connector according to claim 3 wherein the raised surfaces are coated with a material selected from the group consisting of gold, silver and palladium.

5. A connector according to claim 3 wherein each stem portion comprises at least two segments which extend from the end portion at first and second angles from an edge of the end portion, and the raised surfaces are located at the ends of the segments.

6. A connector module according to claim 1 wherein the insulating body comprises a series of ribs adjacent to the stem portions of corresponding contacts and positioned so as to prevent bending of the leads inserted into the slots as the leads make contact with their corresponding stem portions.

* * * * *